Patented June 5, 1934

1,961,519

UNITED STATES PATENT OFFICE 1,961,519

WATER - INSOLUBLE MONO - AZO - DYE-
STUFFS AND FIBER DYED THEREWITH

Leopold Laska and Arthur Zitscher, Offenbach-
on-the-Main, Germany, assignors to General
Aniline Works, Inc., New York, N. Y., a corpora-
tion of Delaware No Drawing. Application July 10, 1933, Serial No.
679,826. In Germany July 30, 1932

4 Claims. (Cl. 260—95)

The present invention relates to valuable water-insoluble mono-azo-dyestuffs and to fiber dyed therewith; more particularly it relates to dyestuffs corresponding to the following general formula:

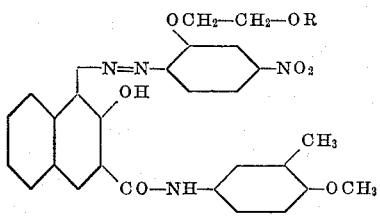

wherein R means alkyl.

These dyestuffs may be obtained by coupling the diazo compounds of 1-amino-2$^2$-alkoxy-2-ethoxy-4-nitrobenzenes of the following constitution:

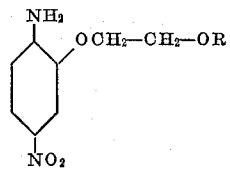

wherein R means alkyl, with 2'-hydroxynaphthalene - 3' - carbonyl - (1-amino-4-methoxy-3-methylbenzene), either in substance, on the fiber or an any of the usual substrata adapted for the production of lakes.

There are thus obtained Bordeaux red mono-azo-dyestuffs which are distinguished by good fastness properties, especially by a very good fastness to exposure. In this respect, they surpass by far the combination prepared from diazotized 5-nitro-2-anisidine and 2'-hydroxynaphthalene-3' - carbonyl - (1 - amino-4-methoxy-3-methylbenzene), described in French Patent No. 679,280.

The said nitro bodies may be prepared, for instance, from 2-aminophenylglycolalkylethers by nitrating the corresponding benzenesulfamides which may be obtained by condensing the amino-compound with benzenesulfochloride.

The following examples serve to illustrate the invention, but they are not intended to limit it thereto, the parts being by weight unless stated otherwise; the relationship between parts by weight and parts by volume is that which exists between a kilogram and a liter:

1. A paste is prepared in a finely dispersed form from 27.4 parts of 1-amino-2$^2$-methoxy-2-ethoxy-4-nitrobenzene, 50 parts by volume of hydrochloric acid of 20° Bé. and a small quantity of cold water and it is diazotized by addition of 7 parts of sodium nitrite in an aqueous solution at a temperature of 5° C. to 10° C. The diazo solution is then coupled with a solution of 32.2 parts of 2'-hydroxy-naphthalene-3'-carbonyl-(1-amino-4-methoxy-3-methylbenzene) in dilute caustic soda solution to which there have been added the quantity of sodium acetate necessary for binding the excess of mineral acid, and Turkey red oil, and, at the same time, part of the acetic acid is neutralized by gradually adding sodium bicarbonate solution. The precipitated dyestuff which corresponds to the following formula:

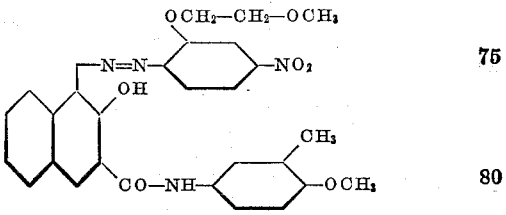

is filtered with suction and washed well. When mixed in the usual manner with substrata, it yields a Bordeaux red lake of very good fastness to light.

2. In order to prepare the dyestuff on the fiber, cotton material which has been pretreated in the usual manner, is impregnated in a solution which contains per liter:

5.5 parts of 2'-hydroxynaphthalene-3'-carbonyl-(1-amino-4-methoxy - 3 - methylbenzene), 11 parts by volume of caustic soda solution of 34° Bé. and 10 parts by volume of Turkey red oil, the material is well squeezed and developed in a feebly acetic acid solution which contains per liter:

2.75 parts of 1-amino-2$^2$-methoxy-2-ethoxy-4-nitrobenzene, it is rinsed and soaped.

A Bordeaux red dyeing of very good fastness to exposure is thus obtained.

By replacing in the foregoing example 2.75 parts of 1-amino-2$^2$-methoxy-2-ethoxy-4-nitrobenzene by the corresponding quantity of 1-amino-2$^2$-ethoxy-2-ethoxy-4-nitrobenzene, there is likewise obtained a Bordeaux red dyeing. By using the diazo compound from 1-amino-2$^2$-n-butoxy-2-ethoxy-4-nitrobenzene, a dark Bordeaux red dyeing is obtained.

The dyestuffs may also be prepared on the fiber according to one of the usual printing processes.

We claim:

1. Water-insoluble mono-azo-dyestuffs of the following general formula:

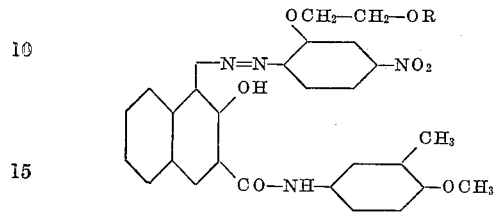

wherein R means alkyl, dyeing Bordeaux red shades of good fastness properties, particularly of very good fastness to exposure.

2. The water-insoluble mono-azo-dyestuff of the following formula:

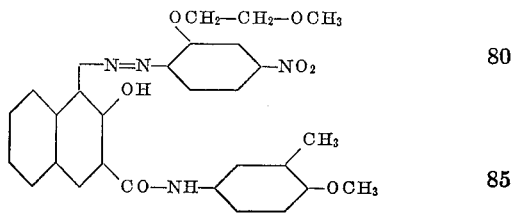

dyeing Bordeaux red shades of good fastness properties, particularly of very good fastness to exposure.

3. Fiber dyed with the mono-azo-dyestuffs as claimed in claim 1.

4. Fiber dyed with the mono-azo-dyestuff as claimed in claim 2.

LEOPOLD LASKA.
ARTHUR ZITSCHER.